(12) United States Patent
Birkner et al.

(10) Patent No.: US 6,799,454 B2
(45) Date of Patent: Oct. 5, 2004

(54) METHOD FOR FUNCTIONAL CHECKING OF AN EXHAUST RECYCLING SYSTEM ON AN INTERNAL COMBUSTION ENGINE

(75) Inventors: Christian Birkner, Irlbach (DE); Arno Friedrich, Regensburg (DE); Michael Käsbauer, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/357,614

(22) Filed: Feb. 4, 2003

(65) Prior Publication Data

US 2003/0131658 A1 Jul. 17, 2003

Related U.S. Application Data

(63) Continuation of application No. PCT/DE01/02935, filed on Aug. 2, 2001.

(30) Foreign Application Priority Data

Aug. 4, 2000 (DE) ........................................ 100 38 258

(51) Int. Cl.⁷ .............................................. G01M 15/00
(52) U.S. Cl. ..................................................... 73/118.1
(58) Field of Search ............................... 73/116, 117.2, 73/117.3, 118.1, 118.2, 23.31, 23.32

(56) References Cited

U.S. PATENT DOCUMENTS

| 5,368,005 | A | * | 11/1994 | Kako ..................... 123/568.16 |
| 5,542,400 | A | * | 8/1996 | Matsumoto et al. ... 123/568.16 |
| 5,621,167 | A | | 4/1997 | Fang-Cheng ............... 73/118.1 |
| 5,791,319 | A | * | 8/1998 | Friedrich et al. ...... 123/568.18 |
| 5,964,820 | A | * | 10/1999 | Miwa et al. ................. 701/108 |
| 6,024,075 | A | * | 2/2000 | Bidner et al. .......... 123/568.16 |
| 2003/0106367 | A1 | * | 6/2003 | Osaki et al. ............... 73/118.2 |

FOREIGN PATENT DOCUMENTS

| DE | 4219339 A1 | 1/1993 | .......... F02D/41/22 |
| DE | 4216044 A1 | 11/1993 | .......... F02M/25/06 |
| DE | 195 27 030 A1 | 2/1996 | .......... F02D/21/08 |
| FR | 2674574 A1 | 3/1991 | .......... F02D/21/08 |

OTHER PUBLICATIONS

International Preliminary Search Report PCT/DE01/02935 6 pages (German), Mailed Aug. 1, 2002.
International Search Report PCT/DE01/02935 4 pages (English), Mailed Dec. 10, 2001.

* cited by examiner

*Primary Examiner*—Eric S. McCall
(74) *Attorney, Agent, or Firm*—Baker Botts L.L.P.

(57) ABSTRACT

For the checking of an exhaust gas recycling valve, the control signal for the exhaust gas return valve is returned from a defined value to zero, in the idle state of the internal combustion engine while the vehicle is at a standstill and the reaction of the signal (MAF) from an airflow detector in the inlet tract is evaluated. Should the signal not exceed a given threshold value (MAE SWD), within a first time period (T2), then a faulty dynamic is assigned to the exhaust recycling valve. Should the signal not exceed a second given threshold value (MAF SWS), within a second time period (T3), then it is determined that the exhaust recycling valve can not be completely shut.

12 Claims, 3 Drawing Sheets

METHOD FOR FUNCTIONAL CHECKING OF AN EXHAUST RECYCLING SYSTEM ON AN INTERNAL COMBUSTION ENGINE

CROSS REFERENCE TO RELATED APPLICATION

This application is a continuation of copending International Application No. PCT/DE01/02935 filed Aug. 2, 2001, which designates the United States, and claims priority to German application number 10038258.4 filed Aug. 4, 2000.

BACKGROUND OF THE INVENTION

The invention relates to a method for checking the functional capacity of an exhaust gas recycling system on an internal combustion engine.

Exhaust gas recycling systems are used to reduce the proportion of nitrogen oxide in the exhaust gas of an internal combustion engine. A proportion of the exhaust gas is returned via an exhaust gas recycling line from the exhaust gas tract into the inlet tract, i.e. into the collector in the manifold pipe. Electrical signals from a control device are used to activate an exhaust gas recycling valve in the exhaust gas recycling line, thereby adjusting the mass of the recycled exhaust gas. As the basic components of the exhaust gas in the internal combustion engine mean that it is an inert gas, adding exhaust gas to the combustion air intake can reduce the peak combustion temperature and thereby reduce the emission of nitrogen oxides. The mass of the recycled exhaust gas in relation to the sum of the mass of the fresh gas (air intake) and the mass of recycled exhaust gas is generally designated as the exhaust gas recycling rate.

Monitoring of the capacity of such an exhaust gas recycling valve to be controlled and closed is essential in order to be able to ensure its correct operation. In order to comply with the exhaust gas limit values required by legislation, it is necessary to equip vehicles with diagnostic equipment which makes it possible to detect malfunctions of sensors and systems associated with the control or activation of components relating to the exhaust gas and to issue appropriate error messages. The checking of all components in the air route is of particular significance with regard to compliance with the statutory guidelines for on board diagnosis (OBD) for vehicles. In particular it must be possible for the exhaust gas recycling valve to close completely, as otherwise, if the internal combustion engine operates with the exhaust gas recycling valve constantly open, the required exhaust gas limit values may be exceeded.

An abnormality detection method and a device for an exhaust gas recycling control system on an internal combustion engine are disclosed in DE 195 27 030 A1. The abnormality here is the result of operational delay on the part of a diaphragm, which forms an exhaust gas recycling valve (EGR valve). The exhaust gas recycling valve is controlled on the basis of engine operating data and intake distributor pressure. A condition which has to be fulfilled to activate the abnormality decision is detected. On detection of the abnormality decision activation condition the exhaust gas recycling valve is forcibly opened or closed. Depending on the difference in intake distributor pressure on forcible opening/closing of the exhaust gas recycling valve, a possible abnormality of the exhaust gas recycling valve is concluded.

SUMMARY OF THE INVENTION

The object of the invention is to specify a method which can be used to check the functional capacity of the exhaust gas recycling system on the internal combustion engine simply and without additional sensors during operation of the internal combustion engine and without adversely affecting the driving operation. This object can be achieved by a method for checking the functional capacity of an exhaust gas recycling system on an internal combustion engine comprising the steps of:

providing an exhaust gas recycling line, which connects an exhaust gas tract on the internal combustion engine to an inlet tract on the internal combustion engine, so that exhaust gas can be returned to the inlet tract, providing an exhaust gas recycling valve located in the exhaust gas recycling line used to adjust the traversable cross-section of the exhaust gas recycling line and activated by electrical signals, activating the exhaust gas recycling activated for diagnosis purposes such that operating parameters of the internal combustion engine change and the reaction of the operating parameters is analysed, wherein when the internal combustion engine is in the idle state and the vehicle driven by the internal combustion engine is stationary, using the output signal of an airflow detector located in the inlet tract upstream from the junction with the exhaust gas recycling line as the operating parameter.

The activation signal for the exhaust gas recycling valve can be set to zero based on a value set in the idle state, in order to close the exhaust gas recycling valve. After expiry of a predefined first time period the signal from the airflow detector can be detected and compared with a first threshold value. It can be concluded that the exhaust gas recycling valve is faulty with regard to dynamic behaviour, if the threshold value is not exceeded within the first time period. The activation signal for the exhaust gas recycling valve can also be set to zero on the basis of a value set in the idle state, in order to close the exhaust gas recycling valve, after expiry of a predefined second time period the signal from the airflow detector can be detected and compared with a second threshold value and it can be concluded that the exhaust gas recycling valve is faulty with regard to its capacity to close completely, if the threshold value is not exceeded within the second time period. On identification of a faulty exhaust gas recycling valve, a corresponding entry can be made in an error memory. The check can be terminated if the engine is no longer in the idle state or the vehicle is no longer stationary within a predefined time period. The threshold values and the time periods can be determined by experiment and stored in a memory device.

An arrangement for checking the functional capacity of an exhaust gas recycling system on an internal combustion engine, comprises:

an exhaust gas recycling line, which connects an exhaust gas tract on the internal combustion engine to an inlet tract on the internal combustion engine, so that exhaust gas can be returned to the inlet tract, an exhaust gas recycling valve located in the exhaust gas recycling line used to adjust the traversable cross-section of the exhaust gas recycling line and activated by electrical signals, means for activating the exhaust gas recycling valve for diagnosis purposes such that operating parameters of the internal combustion engine change and the reaction of the operating parameters is analysed, wherein when the internal combustion engine is in the idle state and the vehicle driven by the internal combustion engine is stationary, the output signal of an airflow detector located in the inlet tract upstream from the junction with the exhaust gas recycling line is used as the operating parameter.

Furthermore the arrangement can provide:

means for setting the activation signal for the exhaust gas recycling valve to zero based on a value set in the idle state, in order to close the exhaust gas recycling valve, means for detecting and comparing the signal from the airflow detector with a first threshold value after expiry of a predefined first time period, and means for concluding that the exhaust gas recycling valve is faulty with regard to dynamic behaviour, if the threshold value is not exceeded within the first time period.

The arrangement can also provide:

means for setting the activation signal for the exhaust gas recycling valve to zero on the basis of a value set in the idle state, in order to close the exhaust gas recycling valve, means for detecting and comparing the signal from the airflow detector with a second threshold value after expiry of a predefined second time period, and means for concluding that the exhaust gas recycling valve is faulty with regard to its capacity to close completely, if the threshold value is not exceeded within the second time period.

The invention is characterised by the fact that the exhaust gas recycling valve is closed for checking the exhaust gas recycling valve when the internal combustion engine is in the idle state and the signal from an airflow detector in the inlet tract of the internal combustion engine upstream from the junction of an exhaust gas recycling line with the inlet tract is analysed.

If this signal does not exceed a first predefined threshold value within a first time period, it is concluded that the dynamic of the exhaust gas recycling valve is faulty. If the signal does not exceed a second predefined threshold value within a second time period, it is determined that the exhaust gas recycling valve cannot be completely closed.

When the internal combustion engine is in the speed-controlled idle state, the exhaust gas recycling valve controls the cross-section of the opening of the exhaust gas recycling line generally to a specific position. In this operating state a brief check of the capacity of the exhaust gas recycling valve to be controlled and closed is possible without an adverse effect on drive capacity and drive safety. As the idling of the internal combustion engine is well defined as an operating state and occurs very frequently in day-to-day driving operations (e.g. traffic lights) it is very appropriate for diagnosis purposes. The method in particular has the advantage that no additional sensors are required for checking the capacity of the exhaust gas recycling valve to be controlled and closed.

BRIEF DESCRIPTION OF THE DRAWINGS

An embodiment of the invention is described in more detail below with reference to the diagrams.

These show.

DETAILED DESCRIPTION OF THE PREFERRED EMBODIMENTS

Figure 1:
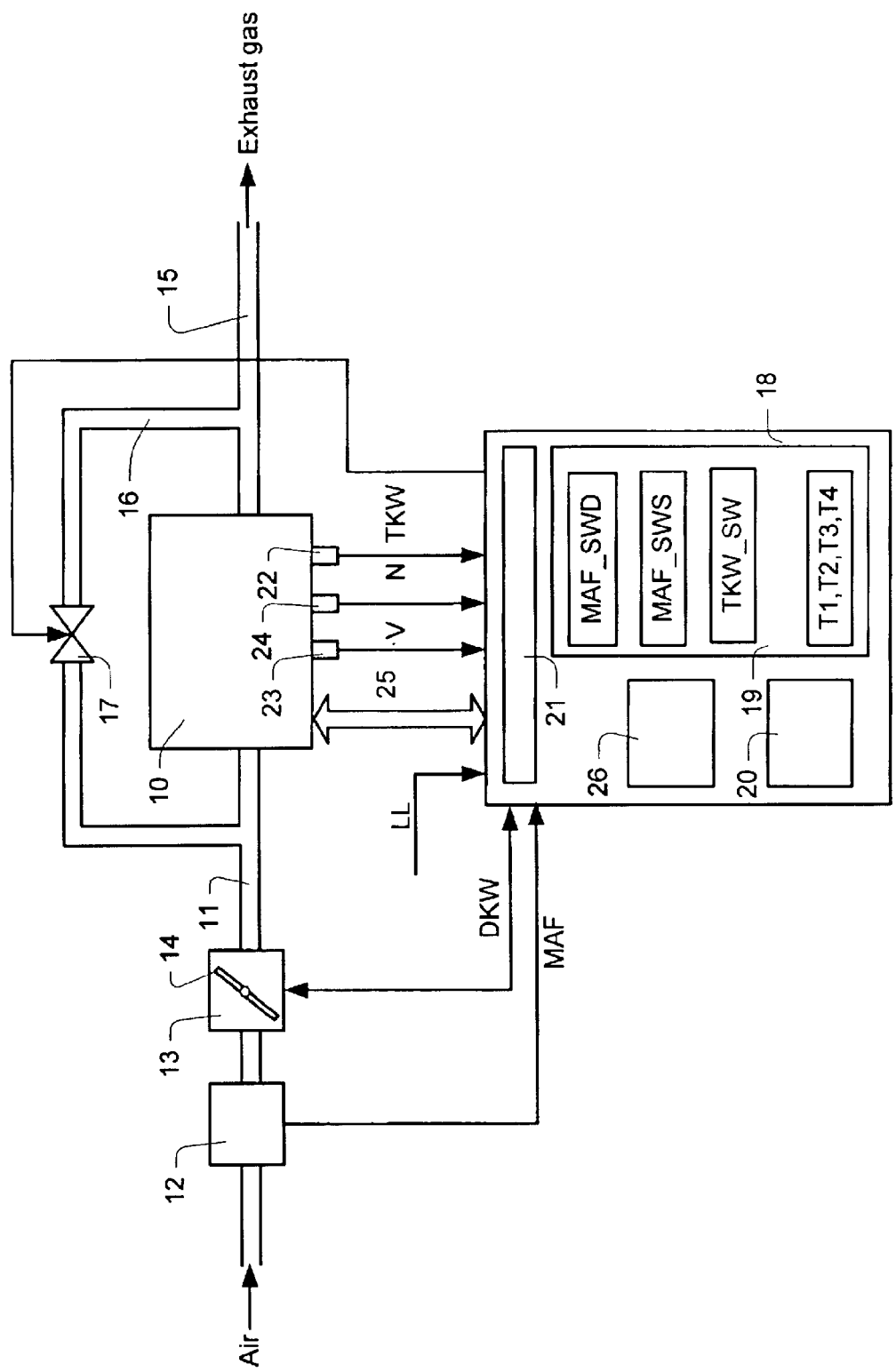
FIG. 1 a block diagram of an internal combustion engine with an exhaust gas recycling device and a control device for carrying out the method according to the invention, FIG. 2 a flow diagram of the method and FIG. 3 a time-based diagram for selected operating parameters of the internal combustion engine.

FIG. 1 is a block circuit diagram showing in very simplified form a diesel internal combustion engine 10, in which the method according to the invention is used. Only those components are shown which are essential for an understanding of the invention. The fuel circuit and exhaust gas treatment unit in particular are not shown. The method according to the invention can however be used in a spark-ignited internal combustion engine, in which case the actuators and sensors should be modified accordingly.

The air required for combustion is supplied to the internal combustion engine 10 via an inlet tract 11. An airflow detector 12 and a throttle valve block 13 are provided one behind the other in the direction of flow of the air intake (arrow symbols) in the inlet tract 11. The valve block contains a throttle valve 14 and optionally a throttle valve sensor (not shown), which detects a signal corresponding to the angle of opening of the throttle valve 14. The throttle valve 14 is for example an electromotively activated throttle device (e-gas) the cross-section of the opening of which can be adjusted on the basis of the operating range of the internal combustion engine via electrical signals from a control device as well as by activation by the driver (driver control).

On the output side the internal combustion engine 10 is connected to an exhaust gas tract 15, in the further reaches of which an exhaust gas catalytic converter and a silencer are located (not shown).

An exhaust gas recycling line 16 branches off from the exhaust gas tract 15 and joins the inlet tract 11 downstream from the throttle valve block 13. An exhaust gas recycling valve 17 is located in the exhaust gas recycling line 16 and contains an electromagnetic actuator (not shown).

An electronic control device 18 controls and regulates the internal combustion engine 10. Such electronic control devices, which generally contain one or more microprocessors, are in themselves known, so only the structure and its operation as relevant to the invention are examined below. In particular the control device 18 has an error memory 20 and a memory device 19, in which different characteristic maps and threshold values are stored, the significance of which is explained in more detail in the descriptions of the other figures.

The control device 18 also contains a pre-processing unit 21, which processes sensor signals, which detect operating parameters of the internal combustion engine 10. In particular a signal MAF from the airflow detector 12, a signal TKW from a coolant temperature sensor 22, a signal v from a vehicle speed sensor 23, a signal N from an engine speed sensor 24 and a signal LL, which characterises the idle state of the internal combustion engine 10 are supplied to the control device 18. The idle state can for example be identified by analysis of the signal from a pedal sensor (not shown). The control device 18 is also connected to other sensors and actuators not specifically shown by means of a data/control bus 25.

The electronic control device 18 also has an electrical device 26 to control the actuator of the exhaust gas recycling valve 17, which adjusts the degree of opening of the exhaust gas recycling valve 17 on the basis of one or more operating parameters of the internal combustion engine.

Figure 2:
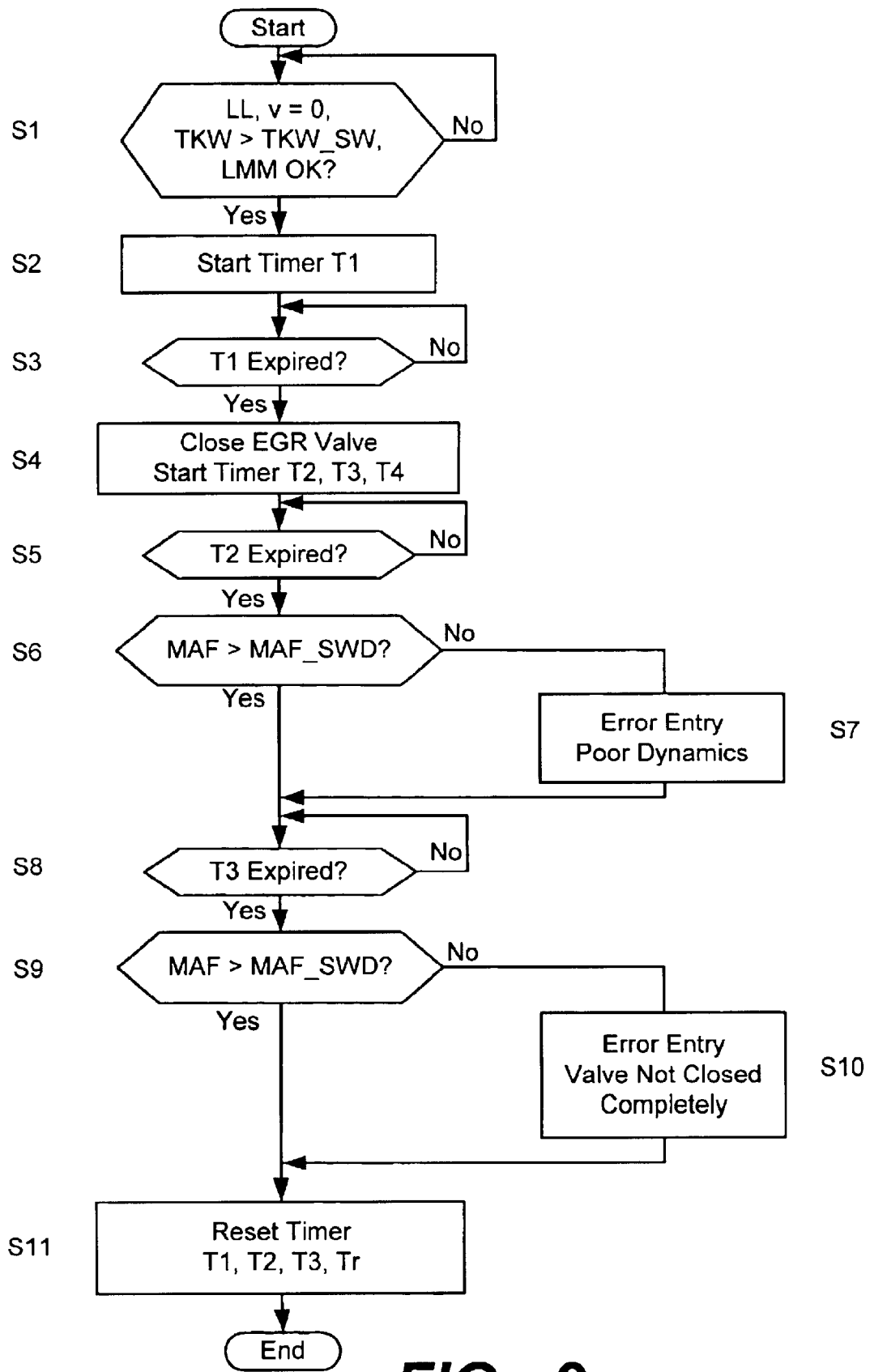

A flow diagram of the method for checking the exhaust gas recycling system is shown in FIG. 2.

In a first method stage S1 it is ascertained whether predefined conditions for carrying out the diagnosis are satisfied. The most important requirement for carrying out the diagnosis is that the internal combustion engine is in the idle state. In order to prevent any adverse effect on the driving operation during diagnosis, it is also checked whether the vehicle speed v is approximately zero. As vehicle speeds v=0 can only be detected with relative difficulty, vehicle speeds which are greater than zero but are still below a certain predefined limit value (e.g. 1.8 km/h) are processed as a signal for v=0. The coolant temperature TKW must also be above a predefined threshold value TKW_SW (warm internal combustion engine) and there must be no error entry for the airflow detector 12 in the error memory 20. These enquiries are repeated constantly until the result of the enquiry is positive.

When this is so, a specific value EGR1 (FIG. 3b) is set for the control signal EGR of the exhaust gas recycling valve 17 based on the speed-controlled idle state of the internal combustion engine and a timer is started for a first time period T1 (time t0, method stage S2). Within this time period T1 the idle speed controller and exhaust gas recycling valve have sufficient time to reach their state of equilibrium (method stage S3). If the time period T1 has expired, in a method stage S4 the control signal EGR is set to the value zero based on the value EGR1 for the diagnosis, to close the exhaust gas recycling valve 17 completely. This is simplified qualitatively in the form of a jump in FIG. 3b). In order for there to be no inconvenience to the driver of the vehicle driven by the internal combustion engine 10, this transition can also be slightly delayed, for example after a ramp function.

At the same time other timers are started in method stage S4 for time periods T2, T3 and T4 of different lengths. After expiry of time period T2 (method stage S5), the activation dynamic of the exhaust gas recycling valve 17 can be checked. The signal MAF of the airflow detector 12, is analysed for this purpose by comparing the current value of the signal MAF from the airflow detector 12 with a predefined threshold value MAE-SWD (method stage S6).

If the value of the signal MAF from the airflow detector is above the threshold value MAF_SWD after expiry of the time period T2, the exhaust gas recycling valve 17 has been closed sufficiently quickly and the dynamic of the exhaust gas recycling valve 17 is classified as adequate in respect of the closing process, otherwise in method stage S7 there is a corresponding error entry, e.g. "poor dynamic" in the error memory 20.

After expiry of the time period T3 (enquiry in method stage S8), after which the exhaust gas recycling valve 17 should be closed in all instances regardless of its dynamic characteristics, the capacity of the exhaust gas recycling valve 17 to close completely can be checked. The signal MAF from the airflow detector 12 is analysed again for this purpose by comparing the value of the signal MAF from the airflow detector 12 with a higher threshold value MAF_SWS compared with the first threshold value MAF_SWD after expiry of the time period T3 (method stage S9).

If the value of the signal MAF from the airflow detector is above the threshold value MAF_SWS after expiry of the time period T3, the exhaust gas recycling valve 17 has been closed completely and the exhaust gas recycling valve 17 is identified as free from error, otherwise a corresponding error entry, e.g. "exhaust gas recycling valve does not close completely", is made in the error memory 20 in method stage S10.

The two specified error entries for the exhaust gas recycling valve 17 are generally stored in the form of a code like all other error entries. It is also expedient not to input the error entries until a statistical analysis has been carried out, in order to avoid incorrect entries. It is also possible to indicate the result of the diagnosis, in particular in the event of an error, by means of an acoustic and/or optical warning device, for example an error light inside the vehicle.

Such activation of the exhaust gas recycling valve in the idle state with the vehicle stationary generally only needs to be carried out once per driving cycle, in so far as the diagnosis can be completed within the time period T4 (FIG. 3c). As soon as the diagnosis conditions cease to be satisfied during the diagnosis process, in particular if the engine is no longer in the idle speed operating range, diagnosis should be terminated immediately, in order not to put drive capacity and safety at risk and should be resumed once the necessary conditions are satisfied.

The time periods T1, T2, T3, T4 and the threshold values for the air mass flow MAF_SWD, MAF_SWS are determined by experiment in test drives and/or on the test bench and are stored in the memory device 19.

In a last method stage S11 all counters are then reset for the time periods and the method is completed.

Figure 3:
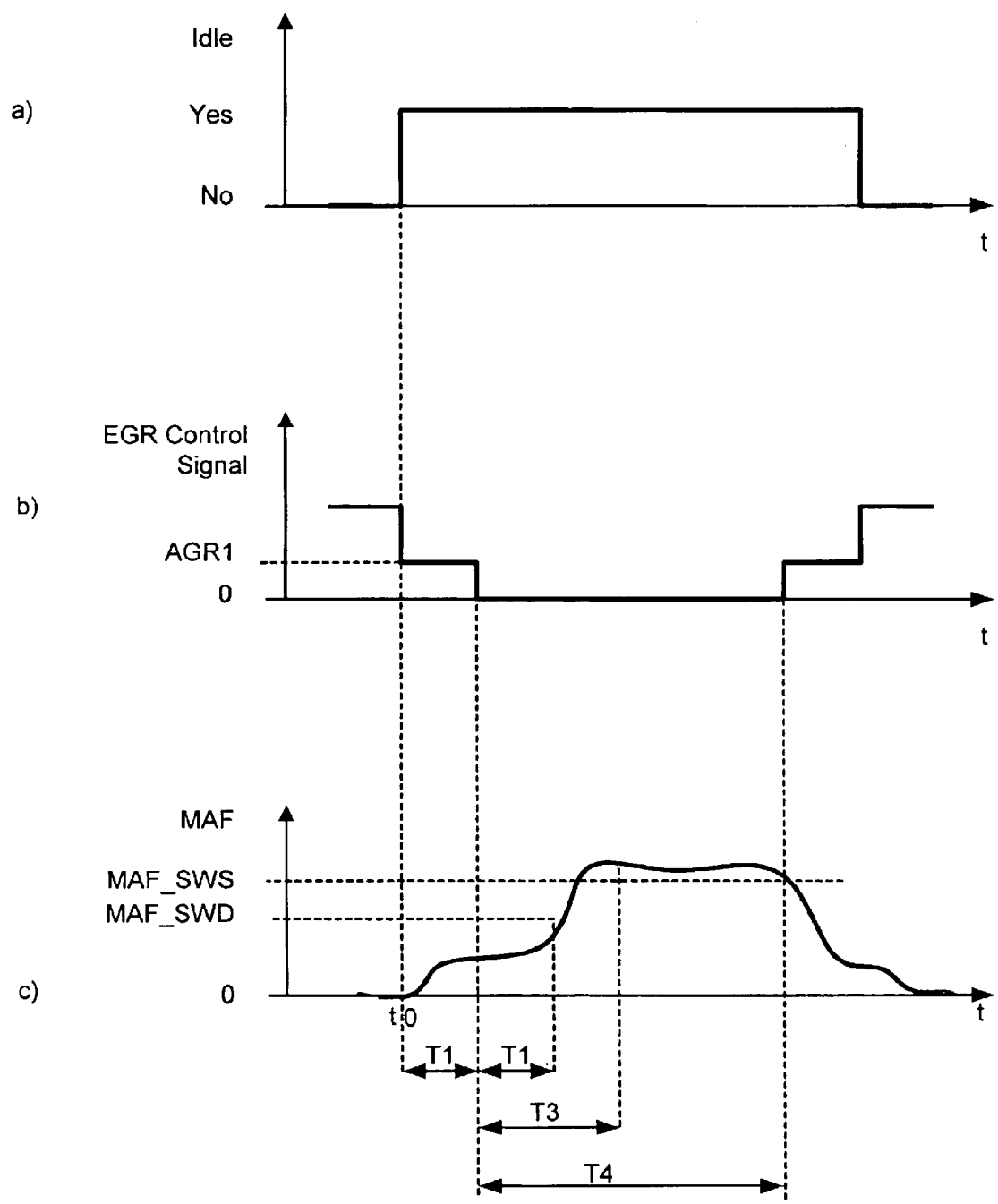

FIG. 3 shows the time-based diagrams for selected operating parameters of the internal combustion engine, with FIG. 3a) showing a signal characterising the idle state, FIG. 3b) showing the activation signal for the exhaust gas recycling valve and FIG. 3c) showing the signal from the airflow detector MAF, as well as the threshold values MAF_SWD, MAF_SWS and the time periods T1 to T4.

What is claimed is:

1. Method for checking the functional capacity of an exhaust gas recycling system on an internal combustion engine, comprising:
    with an exhaust gas recycling line, which connects an exhaust gas tract on the internal combustion engine to an inlet tract on the internal combustion engine, so that exhaust gas can be returned to the inlet tract;
    with an exhaust gas recycling valve located in the exhaust gas recycling line used to adjust the traversable cross-section of the exhaust gas recycling line and activated by electrical signals;
    with the exhaust gas recycling valve being activated for diagnosis purposes such that operating parameters of the internal combustion engine change and the reaction of the operating parameters is analysed, wherein
        when the internal combustion engine is in the idle state and the vehicle driven by the internal combustion engine is stationary, the output signal of an airflow detector located in the inlet tract upstream from the junction with the exhaust gas recycling line is used as the operating parameter;
        the activation signal for the exhaust gas recycling valve is set to zero based on a value set in the idle state, in order to close the exhaust gas recycling valve,
        after expiry of a predefined first time period the signal from the airflow detector is detected and compared with a first threshold value and
        it is concluded that the exhaust gas recycling valve is faulty with regard to dynamic behaviour, if the threshold value is not exceeded within the first time period.

2. Method according to claim 1, wherein
    the activation signal for the exhaust gas recycling valve is set to zero on the basis of a value set in the idle state, in order to close the exhaust gas recycling valve,
    after expiry of a predefined second time period the signal from the airflow detector is detected and compared with a second threshold value and
    it is concluded that the exhaust gas recycling valve is faulty with regard to its capacity to close completely, if the threshold value is not exceeded within the second time period.

3. Method according to claim 1, wherein on identification of a faulty exhaust gas recycling valve, a corresponding entry is made in an error memory.

4. Method according to claim 1, wherein the check is terminated if the engine is no longer in the idle state or the vehicle is no longer stationary within a predefined time period.

5. Method according to claim 2, wherein the threshold values and the time periods are determined by experiment and stored in a memory device.

6. Method for checking the functional capacity of an exhaust gas recycling system on an internal combustion engine comprising the steps of:

provding an exhaust gas recycling line, which connects an exhaust gas tract on the internal combustion engine to an inlet tract on the internal combustion engine, so that exhaust gas can be returned to the inlet tract;

providing an exhaust gas recycling valve located in the exhaust gas recycling line used to adjust the traversable cross-section of the exhaust gas recycling line and activated by electrical signals;

activating the exhaust gas recycling activated for diagnosis purposes such that operating parameters of the internal combustion engine change and the reaction of the operating parameters is analysed, wherein when the internal combustion engine is in the idle state and the vehicle driven by the internal combustion engine is stationary, using the output signal of an airflow detector located in the inlet tract upstream from the junction with the exhaust gas recycling line as the operating parameter;

the activation signal for the exhaust gas recycling valve is set to zero based on a value set in the idle state, in order to close the exhaust gas recycling valve, after expiry of a predefined first time period the signal from the airflow detector is detected and compared with a first threshold value and wherein it is concluded that the exhaust gas recycling valve is faulty with regard to dynamic behaviour, if the threshold value is not exceeded within the first time period.

7. Method according to claim 6, wherein the activation signal for the exhaust gas recycling valve is set to zero on the basis of a value set in the idle state, in order to close the exhaust gas recycling valve, after expiry of a predefined second time period the signal from the airflow detector is detected and compared with a second threshold value and wherein it is concluded that the exhaust gas recycling valve is faulty with regard to its capacity to close completely, if the threshold value is not exceeded within the second time period.

8. Method according to claim 6, wherein on identification of a faulty exhaust gas recycling valve, a corresponding entry is made in an error memory.

9. Method according to claim 6, wherein the check is terminated if the engine is no longer in the idle state or the vehicle is no longer stationary within a predefined time period.

10. Method according to claim 7, wherein the threshold values and the time periods are determined by experiment and stored in a memory device.

11. Arrangement for checking the functional capacity of an exhaust gas recycling system on an internal combustion engine comprising:

an exhaust gas recycling line, which connects an exhaust gas tract on the internal combustion engine to an inlet tract on the internal combustion engine, so that exhaust gas can be returned to the inlet tract;

an exhaust gas recycling valve located in the exhaust gas recycling line used to adjust the traversable cross-section of the exhaust gas recycling line and activated by electrical signals;

means for activating the exhaust gas recycling valve for diagnosis purposes such that operating parameters of the internal combustion engine change and the reaction of the operating parameters is analysed, wherein when the internal combustion engine is in the idle state and the vehicle driven by the internal combustion engine is stationary, the output signal of an airflow detector located in the inlet tract upstream from the junction with the exhaust gas recycling line is used as the operating parameter;

means for setting the activation signal for the exhaust gas recycling valve to zero based on a value set in the idle state, in order to close the exhaust gas recycling valve, means for detecting and comparing the signal from the airflow detector with a first threshold value after expiry of a predefined first time period, and means for concluding that the exhaust gas recycling valve is faulty with regard to dynamic behaviour, if the threshold value is not exceeded within the first time period.

12. Arrangement according to claim 11, further comprising:

means for setting the activation signal for the exhaust gas recycling valve to zero on the basis of a value set in the idle state, in order to close the exhaust gas recycling valve, means for detecting and comparing the signal from the airflow detector with a second threshold value after expiry of a predefined second time period, and means for concluding that the exhaust gas recycling valve is faulty with regard to its capacity to close completely, if the threshold value is not exceeded within the second time period.

* * * * *